May 9, 1939.   C. R. PALMER   2,158,045
THERMOMETER
Filed Jan. 24, 1938

INVENTOR.
BY Charles R. Palmer
Wood & Wood ATTORNEYS

Patented May 9, 1939

2,158,045

UNITED STATES PATENT OFFICE 2,158,045

THERMOMETER

Charles R. Palmer, Glen Acres, Ohio, assignor to The Palmer Company, Norwood, Ohio, a corporation of Ohio Application January 24, 1938, Serial No. 186,502

1 Claim. (Cl. 73—371)

This invention relates to thermometers and has a general application to all types of thermometers from which temperature is determined while the thermometer is held manually by the user. The conventional clinical thermometer is a specific illustration of the type of thermometer to which the invention has been particularly directed.

One object of my invention has been to provide a thermometer having a finger piece, or tab, integrated to the thermometer tube, and so located as to conveniently facilitate the handling of the thermometer.

Another object of the invention has been to provide a clinical thermometer tube with a tab positioned at its head end to enable the holder to obtain a firm finger grip on the tube while shaking the mercury down into the bulb.

Another object of my invention has been to provide a thermometer which has integrated thereto a finger piece positioned with respect to the lens of the thermometer and a graduated scale appearing thereon, in order to provide means for determining when the thermometer tube is properly positioned for the reading of temperatures.

Another object of my invention has been to facilitate the reading of clinical thermometers, which is normally very difficult, particularly to the unskilled person, by integrating therewith a finger piece having a relatively flat surface which is adapted to orient the thermometer to reading position when placed between the thumb and index fingers. In the case of the usual clinical thermometer, a flat surface of the finger piece is approximately perpendicular to a line drawn from the bore of the thermometer to the outer extremity of the tube and bisecting the planoconvex lens portion.

Other purposes and objects will be apparent from the following description of a preferred embodiment of my invention.

Figure 3:
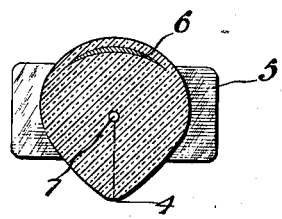
Figure 3 is a cross-section along the line 3—3.

In the conventional clinical thermometer, as illustrated in Figure 3, a thermally expansive fluid such as mercury is confined in a bulb. When heated, the fluid expands upwardly in a bore of very small diameter, such as that shown at 7. In order to magnify this fluid column, a plano-convex lens surface 4 conventionally is provided. A background or curtain 6, preferably consisting of a white stripe painted or enameled on the tube, assists in imparting visibility to the mercury column. This curtain or stripe is located behind the fluid column when the latter is viewed through the lens.

In Figure 3, the lens portion 4, the bore 7, and the curtain 6, are shown in the positions relative to one another, conventional in the ordinary clinical thermometer, and the finger piece 5 is also shown. This figure also shows an imaginary line from the bore 7 to the outer extremity of the tube and bisecting the lens portion.

Figure 1:
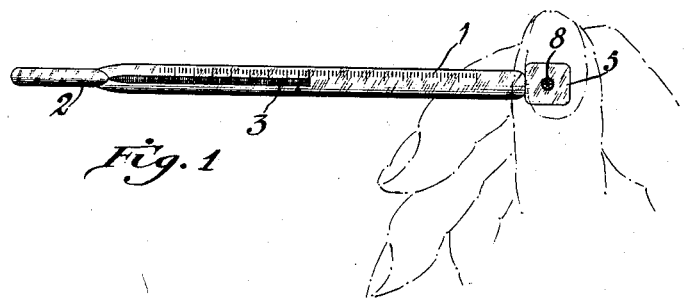
Figure 1 is a front elevation of a conventional clinical thermometer of the type of my invention in reading position—i. e., turned so as to best disclose through the lens the mercury column in the bore of the tube.

The view shown in Figure 1 represents the same conventional clinical thermometer, comprising a glass tube 1, a bulb 2, a column of thermally expansive fluid, such as mercury, 3, a lens portion 4, and a finger piece or tab 5.

Figure 2:
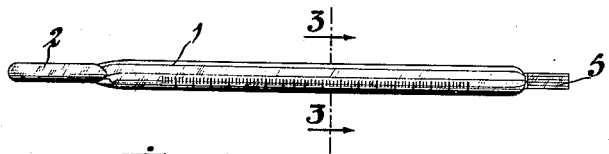
Figure 2 is a side elevation of the same thermometer, turned 90° from the position shown in Figure 1, and with the mercury column no longer visible through the lens.

In Figure 2, the thermometer has been turned to an angle 90° from that shown in Figure 1, in order to illustrate the preferred configuration of the finger piece 5. In this position the mercury column is no longer readily visible, because when viewed in this position the curtain 6 is to the side of the bore instead of behind it and the user is not looking at the bore through the lens.

The finger piece 5 is preferably formed of glass, although the use of other materials is possible, particularly if the materials will amalgamate with the glass of the tube so as to form an integral structure. The exact configuration and position of the finger piece does not constitute the essence of the invention, although it is preferable to have the upper face, or the face which is approximately parallel to the lens, flat, and handling of the thermometer is greatly facilitated, if the lower surface is flat also. The end of the thermometer tube, which is away from the bulb, provides a convenient location for the finger piece, although it may be located elsewhere on the tube if desired.

If flat, the upper surface of the finger piece is preferably in a plane approximately parallel to the reading face of the thermometer and perpendicular to an imaginary line drawn from the bore to the outer extremity of the tube and bisecting the lens portion, in order that the thermometer may be quickly turned to the correct reading position and held in this position with the finger, as illustrated in Figure 1. Figure 3 also illustrates the preferred positioning of the finger piece with respect to the lens portion, the bore and the curtain.

In reading temperatures with a thermometer of the type herein described, the thermometer is turned until the upper surface of the finger piece is perpendicular to the line of vision of the user. When a thermometer of the preferred construction of my invention is in this position the visibility of the fluid column will be at a maximum, because the lens surface will be turned toward the reader and the column will be between the lens and the curtain.

If the finger piece does not have a flat upper surface the same result may be accomplished by having an indicating mark, 8, on the surface of the finger piece. This indicating mark fulfills the function of the preferred flat surface by quickly advising the thermometer holder when the tube is positioned for reading.

It is reasonably obvious that the handling of a delicate object, such as a clinical thermometer, is greatly facilitated by the presence of the finger piece. In addition, if the thermometer is always handled by means of the finger piece there is no indirect contact between the hand of the user and the mercury or other thermally expansive fluid in the bulb, or in the bore. Under certain circumstances it will be found that this tends to provide a more accurate reading of the thermometer, as the mercury is not affected by the temperature of the hand.

Attention is called to the fact that the distance between the flat surfaces of the finger tab 5, is less than the thickness of the tube. This is clearly illustrated in Figure 3. The purpose of this construction is to enable the holder of the thermometer, who is engaged in shaking the mercury back into the bulb, to grasp the end of the tube in the conventional manner and at the same time rest his fingers on the flat surfaces of the tab. If the flat surfaces were spaced apart a greater distance than the thickness of the tube, the result would be that the holder would be inclined to grasp the tab alone instead of the tab and the tube simultaneously. Vigorous shaking of the tube when grasped only by the tab, will in many instances, result in breaking the joint between the tab and the tube and, in all likelihood, render the thermometer unfit for further use.

The tab provides a convenient handling point for the tube and its preferred flat surfaces enable the holder to obtain a firm fingerhold which is of material assistance in preventing the tube from slipping from the fingers when the mercury is being shaken down into the bulb. The tube is preferably made of a glass of a contrasting color from the clear glass tube, and, in addition to its other advantages, provides a useful space for a trade-mark or other markings which can be applied more economically on the tab than on the tube surface as has been the practice heretofore.

Having fully described my invention, I desire to be limited only by the following claim:

A clinical thermometer comprising, a tube having a bore therein, a bulb adapted to house a thermally expansive fluid, a lens portion and a finger tab integrally connected with the tube, said finger tab having flat surfaces approximately perpendicular to a line drawn from the bore to the outer extremity of the tube, bisecting the lens portion, said flat surfaces being spaced apart a distance less than the thickness of the tube, to support the fingers of a holder of the tube while the thermally expansive fluid is being manually shaken down in the tube.

CHARLES R. PALMER.